United States Patent [19]

Chung

[11] Patent Number: 4,732,058
[45] Date of Patent: Mar. 22, 1988

[54] MEASURING HAMMER

[76] Inventor: Soon W. Chung, 804 Lanarkway, Silver Spring, Md. 20901

[21] Appl. No.: 14,550

[22] Filed: Feb. 13, 1987

[51] Int. Cl.⁴ .............................................. B25D 9/00
[52] U.S. Cl. ............................................. 81/20; 81/25
[58] Field of Search ................ 173/90; 81/20, 23, 22, 81/25

[56] References Cited

U.S. PATENT DOCUMENTS

| | | | |
|---|---|---|---|
| 102,677 | 5/1870 | Gregory | 81/20 X |
| 1,209,583 | 12/1916 | Holmdahl | 81/23 X |
| 2,501,757 | 3/1950 | Cagle | 81/25 X |
| 2,603,260 | 7/1952 | Floren | 81/22 |
| 3,119,424 | 1/1964 | Henry | 81/20 |
| 3,578,825 | 5/1971 | Merrow et al. | 81/20 |
| 4,193,433 | 3/1980 | Sickler | 81/23 |

Primary Examiner—Nicholas P. Godici
Assistant Examiner—Willmon Fridie, Jr.
Attorney, Agent, or Firm—Birch, Stewart, Kolasch & Birch

[57] ABSTRACT

A measuring hammer which is constructed in such a manner as to provide locations in the hammer with specific dimensions so that the hammer itself can be used to make measurements normally required in the construction field. Also, a nail holding aperture is disposed in the head portion thereof for starting a nail into the wood. Advantageously, the measuring hammer contains measurements of 1.5", 12", 16" or 24".

15 Claims, 4 Drawing Figures

MEASURING HAMMER

BACKGROUND OF THE INVENTION

The present invention relates to an improved measuring hammer having multiple functions and more particularly, to a measuring hammer having a plurality of measuring portions disposed thereon, which can be used to readily measured an object of any size in the construction field. In addition, the present invention relates to a measuring hammer including a nail holding aperture disposed in the head portion thereof for initially holding a nail to hammer it into an object which is difficult to reach by the operator.

There are many types of measuring hammers which are well known in the art having a measuring portion thereon. However, such hammers have proven to be only theoretical and thus do not have any practical use in the construction field for the claimed purpose. That is, in the construction field, there is the need to use measurements of 1.5", 12", 16" and 24" or two times and three times such measurements for measuring objects such as floor joist, studs, ceiling joist, rafters, framing materials, subflooring, sheathing board, dry wall, etc. Also, it is difficult for such hammers to drive a nail into some portions of an object where it is difficult to maneuver the hands for holding the nail to start the nail into the wood.

OBJECTS AND SUMMARY OF THE INVENTION

Accordingly, it is an object of the present invention to provide an improved measuring hammer.

Another object of the present invention is to provide a measuring hammer having a plurality of measuring portions which can be used to measure distances of 1.5", 12", 16" and 24" whereby the hammer can be readily used to measure any size object and is practically utilizable in the construction field.

A further object of the present invention is to provide a measuring hammer containing a nail holding aperture disposed in a head portion thereof for holding a nail to initially drive the nail in a portion of an object which is located in a difficult place for the operator to reach.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a measuring hammer which is constructed in such a manner as to provide locations in the hammer with specific dimensions so that the hammer itself can be used to make measurements normally required in the construction field. Also, a nail holding aperture is disposed in the head portion thereof for starting a nail into the wood. Advantageously, the measuring hammer contains measurements of 1.5", 12", 16" or 24".

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
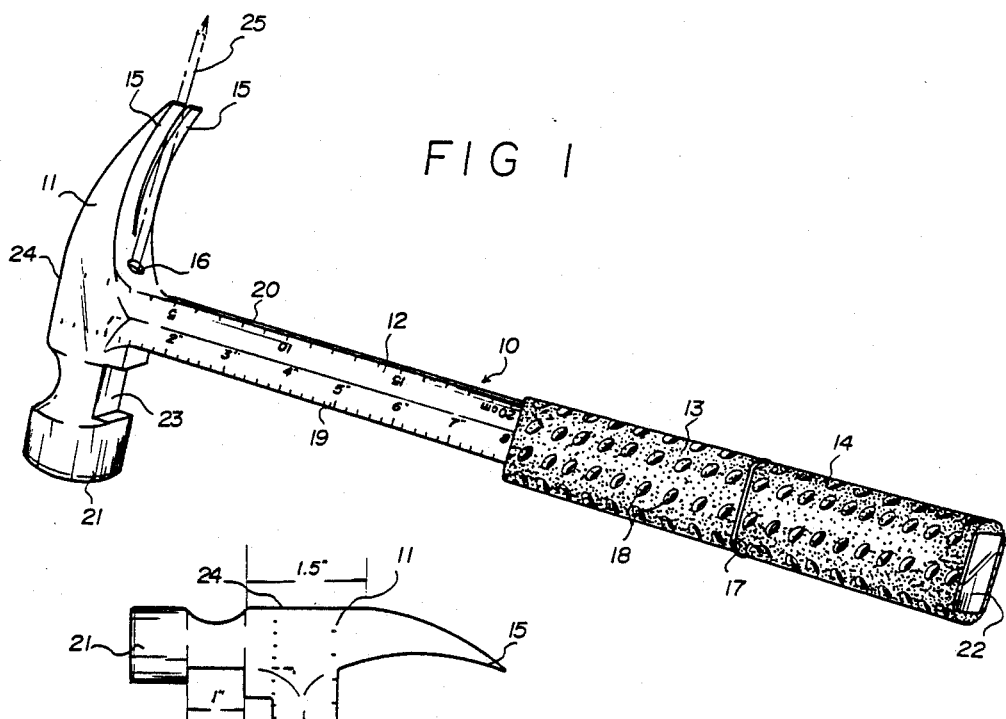
FIG. 1 is a perspective view of the measuring hammer of the present invention.
Figure 2:
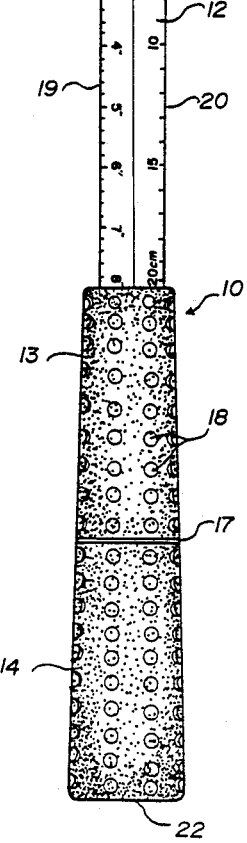
FIG. 2 is a front elevational view of the measuring hammer of the present invention.

Referring now in detail to the drawings for the purpose of illustrating the present invention, the measuring hammer 10 as shown in FIGS. 1 and 2 comprises a head member 11, a neck member 12, and a handle portion composed of a front handle member 13 and a rear handle member 14.

Figure 3:
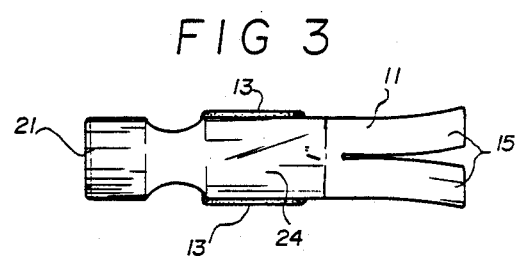
FIG. 3 is a top end plan view of the measuring hammer of the present invention.
Figure 4:
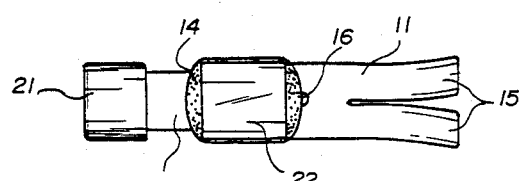
FIG. 4 is a bottom end plan view of the measuring hammer of the present invention.

The head member 11 contains nail pulling claws 15 disposed at one end, a rectangular plate 24 disposed at the middle-top portion of the head member 11, a striking head 21, and a square shaped slot 23 disposed between the striking head 21 and neck member 12. Also, the head member 11 contains a nail holding aperture 16 which is adapted to receive a nail 25. The rectangular plate 24 is 1" in width measured across the head and 1.5" in length measured between the claws and the striking head; see FIGS. 2 and 3. The square plate 23 is 1" in both width and length.

The neck member 12 includes a front edge 19 which is provided with a measuring scale having its measurements in inches. Thus an 8 inch scale extends from the top end of the rectangular plate 24 to the point where the neck member 12 meets the end of the front handle member 13. The rear edge 20 of the neck member 12 is provided with a similar measuring scale in centimeters. Thus, the 8 inch scale in the front edge 19 corresponds to a 20 cm scale in the rear edge 20 of the neck member 12.

A metal ring 17 as an indicator divides the handle portion into the front and rear handle members 13 and 14, respectively. The handle members 13 and 14 can be made of rubber, which contains a plurality of holes 18 which prevent the hammer 10 from slipping from the hand of the user. The rear handle member 14 terminates in a metal plate 22 so that a precise measurement can be made from the end of the head member 11 of the measuring hammer 10 to the end of the handle member 14 which is exactly 16" in length. The front handle member 13 and the rear handle member 14 are each 4 inch in length. Thus, the entire length of the measuring hammer 10 of the present invention is 16 inch, and the length from the metal ring 17 to the rectangular plate 24 is 12 inch. Thus frequently used measurements of 1.5", 12", 16" or 24" can be determined by using the measuring hammer 10 of the present invention.

The present invention provides the measuring hammer 10 which has practical use in the construction field.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A measuring hammer comprising:

a head member, a neck member and a handle member, said head member having a striking head and claw members with an intermediate plate member disposed therebetween having a precise dimension along the top surface thereof, a slot disposed between the striking head and the neck member, said slot having a precise dimension, said neck member having a front edge and a rear edge, one of said edges having a measuring scale in inches and the other of said edges having a corresponding measuring scale in the metric system, said measuring scales having precise dimensions which extend from the top of the handle member to the top of the intermediate plate, and said handle member being subdivided by an indicator into equal sections of precise dimension, thereby also establishing a precise measuring dimension between the indicator and the top of the intermediate plate, in one direction, and between the indicator and the end of the handle, in the other direction.

2. The measuring hammer of claim 1 wherein an aperture is provided in the head member of the measuring hammer on the claw side thereof for receiving the head of a nail, said aperture being positioned so that when the head of the nail is inserted in the hole, the other end of the nail is supported by the claw portion of the hammer.

3. The measuring hammer of claim 2 wherein a plate is positioned at the end of the handle member of the measuring hammer to provide a precise measuring dimension between the end of the handle member and the intermediate plate at the head member of the measuring hammer.

4. The measuring hammer of claim 1 wherein the front edge is provided with a measuring scale having its measurements in inches.

5. The measuring hammer of claim 4 wherein the measuring scale is 8 inch scale which extends from the top end of the intermediate plate to the point where the neck member meets the end of the handle member.

6. The measuring hammer of claim 1 wherein the rear edge is provided with a measuring scale having its measurements in centimeters.

7. The measuring hammer of claim 6 wherein the measuring scale is 20 cm scale which extends from the top end of the intermediate plate to the point where the neck member meets the end of the handle member.

8. The measuring hammer of claim 1 wherein the intermediate plate disposed in the head member of the measuring hammer has a rectangular configuration with precise dimensions.

9. The measuring hammer of claim 8 wherein the rectangular plate is 1 inch in width measured across a striking head and 1.5 inch in length measured between the claws and the striking head.

10. The measuring hammer of claim 1 wherein the slot has a square configuration.

11. The measuring hammer of claim 10 wherein the slot is 1 inch in both width and length.

12. The measuring hammer of claim 1 wherein the handle member is made of rubber and has a plurality of holes disposed thereon for preventing the measuring hammer from slipping from the hand of the user.

13. The measuring hammer of claim 1 wherein the indicator is a metal ring which divides the handle member into a front and rear handle members.

14. The measuring hammer of claim 13 wherein the front handle member is 4 inch in length.

15. The measuring hammer of claim 1 wherein the rear handle member is 4 inch in length.

* * * * *